(12) United States Patent
Haynes et al.

(10) Patent No.: US 10,711,923 B2
(45) Date of Patent: *Jul. 14, 2020

(54) SEALING GLAND (71) Applicant: Lake Products Limited, Rosedale, Auckland (NZ)

(72) Inventors: Andrew Leo Haynes, Auckland (NZ); Gabriel Ioan Giurgiu, Auckland (NZ)

(73) Assignee: Lake Products Limited, Auckland (NZ)

( * ) Notice: Subject to any disclaimer, the term of this patent is extended or adjusted under 35 U.S.C. 154(b) by 124 days.

This patent is subject to a terminal disclaimer.

(21) Appl. No.: 15/988,755

(22) Filed: May 24, 2018

(65) Prior Publication Data

US 2019/0093795 A1 Mar. 28, 2019

Related U.S. Application Data (60) Continuation of application No. 29/618,290, filed on Sep. 20, 2017, now Pat. No. Des. 821,553, which is (Continued)

(30) Foreign Application Priority Data

Sep. 21, 2012 (JP) .................................. 2012-225480

(51) Int. Cl.
*F16L 5/08* (2006.01)
*F16L 5/02* (2006.01)
*F16L 5/10* (2006.01)

(52) U.S. Cl.
CPC .. *F16L 5/02* (2013.01); *F16L 5/10* (2013.01)

(58) Field of Classification Search
CPC ................ F16L 5/02; F16L 5/10; E04D 13/14
See application file for complete search history.

(56) References Cited

U.S. PATENT DOCUMENTS

| 2,510,362 A | 6/1950 | Anderson |
| D170,425 S | 9/1953 | Monahan, Jr. |

(Continued)

FOREIGN PATENT DOCUMENTS

| AU | 199895218 | 6/1999 |
| AU | 200042690 | 1/2001 |

(Continued)

OTHER PUBLICATIONS

English translation of Japanese Office Action regarding corresponding Japanese Appl. No. 2012-225480, dated Aug. 2, 2016, 3 pps.

(Continued)

*Primary Examiner* — Gilbert Y Lee
(74) *Attorney, Agent, or Firm* — Foley & Lardner LLP (57) ABSTRACT

A sealing gland for sealing between an elongate member and a surface through which the member extends, the gland comprising a sealing body having an inner membrane for sealing about the elongate member and an outer peripheral region for sealing against the surface. The inner membrane has one or more cut guides on an underside of the membrane arranged to locate adjacent the surface in use. Each cut guide represents a known elongate member option and facilitates the formation of an aperture through the membrane for suitably receiving the associated elongate member option there through in use. A compression ring is also provided to couple the surface over the sealing body to compress the sealing body in use and form an effective seal.

27 Claims, 5 Drawing Sheets

Related U.S. Application Data a division of application No. 29/586,243, filed on Dec. 1, 2016, now Pat. No. Des. 801,487, which is a division of application No. 29/497,627, filed on Jul. 25, 2014, now Pat. No. Des. 785,768, which is a continuation of application No. 14/029,525, filed on Sep. 17, 2013, now Pat. No. 9,206,928.

(56) References Cited

U.S. PATENT DOCUMENTS

| | | | |
|---|---|---|---|
| 3,205,760 | A | 9/1965 | Seckerson et al. |
| D216,693 | S | 3/1970 | Dammer |
| 3,566,738 | A | 3/1971 | Cupit |
| 3,602,530 | A | 8/1971 | Elwart |
| 3,638,503 | A | 2/1972 | Stipanovic et al. |
| 3,654,965 | A | 4/1972 | Gramain |
| 3,677,576 | A | 7/1972 | Gustafson |
| 3,893,919 | A | 7/1975 | Flegel et al. |
| 3,977,137 | A | 8/1976 | Patry |
| 4,120,129 | A | 10/1978 | Nagler et al. |
| D252,703 | S | 8/1979 | Cupit |
| 4,211,423 | A | 7/1980 | Resech |
| 4,333,660 | A | 6/1982 | Cupit |
| D269,454 | S | 6/1983 | Houseman |
| 4,449,554 | A | 5/1984 | Busse |
| 4,469,467 | A | 9/1984 | Odill et al. |
| 4,519,793 | A | 5/1985 | Galindo |
| 4,570,943 | A | 2/1986 | Houseman et al. |
| 4,625,469 | A | 12/1986 | Gentry et al. |
| 4,664,390 | A | 5/1987 | Houseman |
| D292,233 | S | 10/1987 | Schalle |
| D292,234 | S | 10/1987 | Schalle |
| D294,177 | S | 2/1988 | Sherlock |
| 4,903,997 | A | 2/1990 | Kifer |
| D312,506 | S | 11/1990 | Schalle |
| 5,010,700 | A | 4/1991 | Blair |
| 5,018,748 | A | 5/1991 | Schalle |
| 5,036,636 | A | 8/1991 | Hasty |
| D321,565 | S | 11/1991 | Schalle |
| 5,176,408 | A | 1/1993 | Pedersen |
| 5,222,334 | A | 6/1993 | Hasty |
| 5,226,263 | A | 7/1993 | Merrin et al. |
| 5,248,154 | A | 9/1993 | Westhoff et al. |
| 5,347,776 | A | 9/1994 | Skoff |
| 5,414,964 | A | 5/1995 | Bodycomb |
| D364,933 | S | 12/1995 | Schalle |
| D370,274 | S | 5/1996 | Menzies |
| 5,588,267 | A | 12/1996 | Rodriguez et al. |
| D380,039 | S | 6/1997 | Sutherland et al. |
| 5,703,154 | A | 12/1997 | Davis et al. |
| 5,711,536 | A | 1/1998 | Meyers |
| D423,087 | S | 4/2000 | Houseman |
| 6,123,339 | A | 9/2000 | Otsuji et al. |
| D436,157 | S | 1/2001 | Houseman |
| 6,185,885 | B1 | 2/2001 | Thaler |
| D447,222 | S | 8/2001 | Mathers |
| 6,409,178 | B1 | 6/2002 | Raden et al. |
| 6,471,217 | B1 | 10/2002 | Hayfield et al. |
| 6,752,176 | B1 | 6/2004 | Price et al. |
| 6,830,269 | B1 | 12/2004 | Mayle |
| 6,866,271 | B2 | 3/2005 | MacDonald |
| 6,957,817 | B2 | 10/2005 | Goll |
| 7,021,878 | B1 | 4/2006 | Albertson et al. |
| D525,685 | S | 7/2006 | Walton |
| 7,114,301 | B2 | 10/2006 | Bibaud et al. |
| 7,140,618 | B2 | 11/2006 | Valls, Jr. |
| D581,777 | S | 12/2008 | Huang |
| D585,968 | S | 2/2009 | Elkins et al. |
| D593,641 | S | 6/2009 | Plank et al. |
| 7,814,709 | B1 | 10/2010 | Resech |
| 8,141,303 | B2 | 3/2012 | McDow et al. |
| 8,209,923 | B1 | 7/2012 | Rich |
| 8,453,389 | B2 | 6/2013 | Selke et al. |
| 8,608,206 | B2 | 12/2013 | Fedale et al. |
| 8,614,400 | B2 | 12/2013 | Aldrich et al. |
| D699,328 | S | 2/2014 | Haynes |
| 8,656,667 | B2 | 2/2014 | Beall |
| D722,621 | S | 2/2015 | Gray et al. |
| 9,206,928 | B2 | 12/2015 | Haynes et al. |
| 9,255,412 | B2 | 2/2016 | Haynes |
| D785,768 | S | 5/2017 | Haynes et al. |
| D796,013 | S | 8/2017 | Haynes |
| D796,014 | S | 8/2017 | Haynes |
| D796,074 | S | 8/2017 | Bond |
| D796,663 | S | 9/2017 | Mitchell |
| D801,487 | S | 10/2017 | Haynes et al. |
| 2004/0255523 | A1 | 12/2004 | Bibaud et al. |
| 2004/0262854 | A1 | 12/2004 | Matczak et al. |
| 2005/0055889 | A1 | 3/2005 | Thaler |
| 2006/0145428 | A1 | 7/2006 | Dudman |
| 2006/0179725 | A1 | 8/2006 | Chu |
| 2006/0186607 | A1 | 8/2006 | Shih et al. |
| 2007/0101664 | A1 | 5/2007 | Hoy et al. |
| 2007/0143956 | A1 | 6/2007 | Kumakura et al. |
| 2008/0092844 | A1 | 4/2008 | Tsukamoto |
| 2009/0302545 | A1 | 12/2009 | Haynes |
| 2010/0059941 | A1 | 3/2010 | Beele |
| 2010/0126530 | A1 | 5/2010 | Welch et al. |
| 2011/0140371 | A1 | 6/2011 | Strydom |
| 2011/0156354 | A1 | 6/2011 | Egritepe et al. |
| 2011/0266755 | A1 | 11/2011 | Anderson et al. |
| 2012/0126529 | A1 | 5/2012 | Beall |
| 2012/0297573 | A1 | 11/2012 | Iwahara et al. |
| 2013/0020796 | A1 | 1/2013 | Humber |
| 2013/0193652 | A1 | 8/2013 | Whitley |
| 2013/0328300 | A1 | 12/2013 | Bond |
| 2014/0084549 | A1 | 3/2014 | Haynes et al. |
| 2015/0054229 | A1* | 2/2015 | Haynes ............ F16L 5/10 277/606 |
| 2017/0059061 | A1 | 3/2017 | Haynes et al. |

FOREIGN PATENT DOCUMENTS

| | | |
|---|---|---|
| AU | 199911298 | 2/2002 |
| CA | 2104172 | 3/1994 |
| DE | 29613258 | 9/1996 |
| DE | 20015281 | 1/2001 |
| DE | 10358668 | 3/2005 |
| FR | 2862736 | 5/2005 |
| JP | S53-112359 | 9/1978 |
| JP | H06-86230 | 12/1994 |
| JP | 2004-96964 | 3/2004 |
| WO | WO-88/09855 | 12/1988 |
| WO | WO-98/09855 | 3/1998 |
| WO | WO-2006/128790 A1 | 12/2006 |

OTHER PUBLICATIONS

English translation of Japanese Office Action regarding corresponding Japanese Appl. No. 2012-225480, dated Jul. 20, 2017, 5 pps.

Pipetite: You Asked for It, You Got It, Transfer Central States Industries article, vol. 9, Issue 1, Jan. 2012, 4 pps.

* cited by examiner

SEALING GLAND

This application a Continuation of U.S. application Ser. No. 29/618,290, filed Sep. 20, 2017, titled "SEALING GLAND," which is a Divisional of U.S. patent application Ser. No. 29/586,243, filed Dec. 1, 2016, titled "SEALING GLAND," which is a Divisional of U.S. patent application Ser. No. 29/497,627, filed Jul. 25, 2014, entitled "SEALING GLAND," which is a Continuation of U.S. patent application Ser. No. 14/029,525, filed Sep. 17, 2013, entitled "SEALING GLAND", which claims priority to Japanese Application No. 2012-225480, filed Sep. 21, 2012, titled "AN IMPROVED SEALING GLAND", all of which are incorporated herein by reference in their entireties.

FIELD OF INVENTION

The present invention relates to sealing glands and in particular though not solely to sealing glands for sealing the join formed between and about an elongate member such as for example a pipe with a surface, for example a wall, ceiling or floor.

BACKGROUND OF THE INVENTION

Specific requirements for clean areas for example in food handling, biologically sensitive areas, or other such areas requiring a clean seal, requires use of a seal that can be cleaned easily, applied easily and become functional easily yet is also consistent in its sealing engagement to both the pipe and the wall, and that is manufactured from inert and chemically resistant materials, so as to not contaminate the immediate environment, and to withstand cleaning and the like. The same criteria apply when sealing a pipe to a further pipe that it may pass through. The further pipe may be an outer sleeve such as a kick pipe to prevent damage to the inner pipe. Such assemblies are often present where a pipe passes through a wall, floor or ceiling and the wall, floor or ceiling has an outer sleeve for the pipe to pass through.

There are numerous ways of sealing a cavity and join about pipes and similar elongate members to a flat surface which they may pass through. The most simple method for sealing a pipe to a wall is the application of sealant about the periphery of the pipe adjacent the region of the wall into or through which the pipe may pass through. Prior art methods that use sealants and similar are messy and time consuming and the sealant cannot be easily removed and replaced, meaning that the pipe, wall panel or similar cannot be easily removed and replaced.

Another example of these is the use of a stainless steel flange attached to the elongate pipe or member. This is then attached to the flat surface in a first method by standing this off the flat surface and then sealing the space with sealant. This is not an easily removable system. The second is the bolting of the flange to a further wall fitting and locating between the two a sealing component, e.g. an "O" ring. This method and the previous one do not stand up well to vibration and flexure of the pipe relative to the flat surface.

Further methods utilize boots and similar to engage both the pipe and wall. Other methods use a boot with a cut to allow it to be placed and seal an existing pipe and wall installation. Methods that have used boots to date have not resulted in a consistently sealing boot about the pipe and against the bulk head. The solutions that currently exist with a sealable cut for sealing about an existing pipe and wall share the same problems as the uncut ones together with the added problem that the cut does not seal consistently either. Also, typically to reseal a gland, the addition of sealant to obtain an effective seal is required.

A number of solutions exist for sealing a pipe to a protective sleeve. However all of these require some form of additional sealant added to affect a proper seal between the pipe and the protective sleeve.

Increasingly hygienic environments, for example food handling and preparation premises, require high standard chemically inert materials to be present. This is not only to preserve the hygienic environment but also the method of cleaning such places uses highly corrosive clean in place chemicals that attack most materials such as rubbers and steels, including 305 stainless steel. These chemicals or environments are also often thermally elevated increasing their reactivity. Such environments require materials that are compatible with such harsh environments.

Additionally such environments require a vibration and flexure resistant sealing and often fire retardance and resistance. Such relative movement can occur due to impact of the pipe or surface, flow in the elongate member, water or gas hammer or thermal expansion. The relative movement can be both radially and axially of the elongate member.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is therefore an object of the present invention to provide a sealing gland to overcome the above problems with the prior art or at least to provide the public with a choice.

BRIEF DESCRIPTION OF THE INVENTION

In a first aspect the invention may broadly be said to consist of a sealing gland for sealing between an elongate member and a surface through which the member extends, the gland comprising:
  a sealing body having an inner membrane for sealing about the elongate member and an outer peripheral region for sealing against the surface, the inner membrane having one or more guides on a side of the membrane arranged to locate adjacent the surface in use (hereinafter: underside), and wherein each guide represents a known elongate member option and facilitates the formation of an aperture through the membrane for suitably receiving the associated elongate member option therethrough in use, and
  a compression ring arranged to couple the surface over the sealing body to compress the sealing body in use and form an effective seal.

Preferably the sealing body further comprises a retention shoulder for receiving and retaining the compression ring against the sealing body in use. Preferably the retention shoulder is formed between the inner membrane and the outer peripheral region for receiving and retaining an inner peripheral edge of the compression ring in use.

Preferably the outer peripheral region comprises one or more lip seals extending from the side of the sealing body arranged to locate adjacent the surface in use. Preferably the outer peripheral region is an annular flange having a plurality of concentric annular lip seals.

Preferably the compression ring is an annular compression ring arranged to bear against a side of the annular flange opposite the side of the lip seals to capture the flange between the ring and the surface.

Preferably the compression ring comprises one or more fastening apertures for receiving fasteners there through to couple the surface in use.

Preferably the annular flange comprises one or more fastening apertures arranged to coaxially align with the fastening apertures of the compression ring for receiving fasteners there through. Preferably the fastening apertures of the annular flange and of the fastening apertures of the compression ring are equally separated about the flange and about the ring respectively. Preferably said the fastening apertures of the flange lie between two concentric endless lip seals. Preferably the fastening apertures of the flange are of lesser size than the fasteners to fit there through to aid in establishing a seal in use.

Preferably the inner membrane is arranged to seal about a pipe or other elongate cylindrical member.

Preferably wherein the inner membrane is arranged to seal about a pipe and the inner membrane comprises a plurality of concentric annular cut guides representing a plurality of pipe diameter options for facilitating cutting of an aperture in accordance with a diameter of the pipe to be received therethrough in use.

Preferably the cut guides are annular detents on a surface of the sealing body. Alternatively the cut guides are annular projections or markings for example.

Alternatively the inner membrane is arranged to seal about an elongate member of different cross-section, such as a rectangular duct, and the guides are shaped to conform with different size options for such cross-sectional form.

Preferably the inner membrane is substantially planar. Alternatively the inner membrane is conical or any other suitable form.

Preferably the sealing body is formed from an elastic resilient material and preferably chemically inert material. Preferably the sealing body is formed from a moulded plastics material. More preferably the sealing body is formed from Silicon.

Preferably the compression ring is formed from a relatively stiffer material to the sealing body. More preferably the compression ring is formed from stainless steel.

Preferably said seal formed is water and particulate impervious.

In a second aspect the invention may broadly be said to consist of a seal for sealing between an elongate member and a surface, the seal comprising:
   an inner membrane for sealing about the elongate member, and
   an outer peripheral region for sealing against the surface, the inner membrane having one or more guides on a side of the membrane arranged to locate adjacent the surface in use (hereinafter: underside), and wherein each guide represents a known elongate member option and facilitates the formation of an aperture through the membrane for suitably receiving the associated elongate member option there through in use.

Preferably the sealing body further comprises a retention shoulder formed between the inner membrane and the outer peripheral region for receiving and retaining a compression ring in use.

Preferably the outer peripheral region of the sealing body comprises one or more lip seals extending from the underside of the sealing body, and wherein the compression ring is arranged to bear against an opposing side of the annular flange in use to capture the flange between the ring and the surface and cause the lip seals to compress against the surface.

Preferably the outer peripheral region of the sealing body is an annular flange having a plurality of concentric annular lip seals.

Preferably the outer peripheral region comprises one or more fastening apertures for receiving fasteners there through.

Preferably the fastening apertures of the outer peripheral region are of lesser size than the fasteners to aid in establishing a seal in use.

Preferably the inner membrane is arranged to seal about a pipe, and the inner membrane comprises a plurality of concentric annular cut guides representing a plurality of pipe diameter options for facilitating cutting of an aperture in accordance with a diameter of the pipe to be received therethrough in use.

Preferably the guides are annular detents on the underside of the inner membrane.

Preferably the inner membrane is substantially planar. Alternatively the inner membrane has a substantially conical form.

Preferably the seal is formed from an elastic resilient material and chemically inert material and preferably moulded Silicon.

In a further aspect the invention may broadly be said to consist of a sealing gland for sealing between an elongate member and a surface through which the member extends, the gland comprising:
   a sealing body having an inner membrane for sealing about the elongate member and an outer peripheral region for sealing against the surface, the inner membrane having one or more cut guides on a side of the sealing body arranged to locate adjacent the surface in use, the cut guides providing one or more aperture forming options conforming to one or more elongate member options to be received there through after a cut is made along a guide, and
   a compression ring for coupling the surface over the sealing body in use to form an effective seal.

In a further aspect the invention may broadly be said to consist of a seal for sealing between an elongate member and a surface, the seal comprising:
   an inner membrane for sealing about the elongate member, and
   an outer peripheral region for sealing against the surface, the inner membrane having one or more cut guides on a side of the sealing body arranged to locate adjacent the surface in use, the cut guides providing one or more aperture forming options conforming to one or more elongate member options to be received there through after a cut is made along a guide.

In a further aspect the present invention consists in a seal in situ formed between an elongate member and a substantially flat surface by a peripheral sealing gland, said peripheral sealing gland comprising or including,
   a sealing body having an inner membrane for sealing about the elongate member and an outer peripheral region for sealing against the surface, the inner membrane having one or more cut guides on a side of the sealing body arranged to locate adjacent the surface in use, the cut guides providing one or more aperture forming options conforming to one or more elongate member options to be received there through after a cut is made along a guide, and a compression ring for coupling the surface over the sealing body in use to form an effective seal.

In yet a further aspect the invention consists in a sealing gland as herein described with reference to the accompanying drawings.

In yet a further aspect still the invention consists in a method of providing a sealing gland as herein described with reference to the accompany drawings.

In yet a further aspect the present invention consists in situ a pipe and a wall sealed by a peripheral sealing gland as herein described with reference to any one or more of the accompanying drawings.

In still a further aspect the present invention consists in a sealing gland to seal about a substantially elongate member and a substantially flat surface that includes an aperture into which the member extends, comprising or including, a sealing body adapted to form, toward the centre of said sealing body, a seal about said elongate member said seal formed at least in part by elastic deformation about said elongate member, and toward the periphery of said sealing body at least one lip seal adapted to seal to, said substantially flat surface, and a compression ring to bear, on said periphery, on the surface opposite that against said substantially flat surface.

Preferably said sealing body has a plurality of concentric guides at or toward the centre of said body at an underside of body to indicate various sealing aperture sizes that can be cut into said sealing body to deform about and accommodate different sized elongate members.

Preferably said sealing body has a retention shoulder on said surface opposite that against said substantially flat surface to retain said compression ring to said sealing body.

Preferably said interference fit is created independent of any compression achieved by said compression ring.

Preferably a plurality of fasteners are used to retain said sealing gland to said substantially flat surface, via said compression ring, and via first and second set of coaxial apertures formed through the compression ring and sealing body periphery respectively, said fasteners engaging with said substantially flat surface.

Preferably said sealing body has a sealing aperture there through at the centre of said sealing body to seal about said elongate member.

Alternatively said sealing body has no said sealing aperture at the centre there through and a user will cut the sealing aperture as required for the said elongate member.

Preferably said concentric guides and said sealing aperture are circular. Alternatively said concentric indications and said sealing aperture are other than circular to accommodate the cross sectional shape of said elongate member.

Preferably said sealing body is made from a fire retardant silicone material. Preferably said sealing body is made of a red fire retardant silicone material to indicate its presence as a sealing gland.

Preferably there are four lip seals each concentric toward said periphery.

Preferably said compression ring is rigid so as to not substantially deform under the pressure applied by said fasteners.

The present invention envisages a sealing gland of a compression ring and a moulded item.

In use the compression ring is to be used to hold a peripheral zone of the moulded item to a flat surface against which the moulded item seals.

Inwardly of the peripheral zone and the compression ring, the moulded item is adapted to define a choice of openings to effect a seal against a finite range of pipe sizes, annular duct sizes and the like that is to be gland sealed.

The present invention envisages the provision of a moulded item that will provide an aesthetic outer-side appearance yet has on its underside adaptations to allow it to be confirmed by cutting on any chosen inner periphery to the pipe, duct or the like for which a size has been chosen.

In a further aspect the invention consists in a sealing gland comprising:

(I) a moulded item that defines (A) an annular peripheral region having at least one annular seal on its underside effective for sealing against a flat surface and an array of fastener openings or frangible zones to provide "fastener openings" outwardly of said underside seal(s), (B) a membrane region inwardly of the peripheral region which has either (a) an imperforate disc, cone or other form, or (b) has a centrally apertured disc, cone or other form, the membrane region defining on its underside size identified mutually concentric, and concentric to the annular peripheral region and/or its underside seal(s), cut guides whereby a chosen cut be known to fit a particular size diameter pipe, duct or the like, and (II) a compression ring with holes aligned to the fastener holes or the frangible zones to provide the fastener holes of the peripheral region of the moulded item.

Preferably the compression ring is captured by a retention shoulder of the moulded item that over lies a peripheral inner region of the compression ring.

Optionally the compression ring can be adhered to the moulded item or the moulded item can have been in mould engaged to the compression ring.

It will be appreciated any one or more of the above aspects can be provided in combination with any one or more of the above preferred features.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

The term "gland" as used herein includes the meaning of a member to seal between two surfaces, typically where one intrudes into, or near another surface or one member passes through another member or surface.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples.

BRIEF DESCRIPTION OF THE DRAWINGS

Preferred embodiments to the present invention will now be described in reference to the accompanying drawings, whereby.

DETAILED DESCRIPTION

A preferred embodiment of the present invention will now be described with reference to FIG. 1 through 5.

Figure 1:
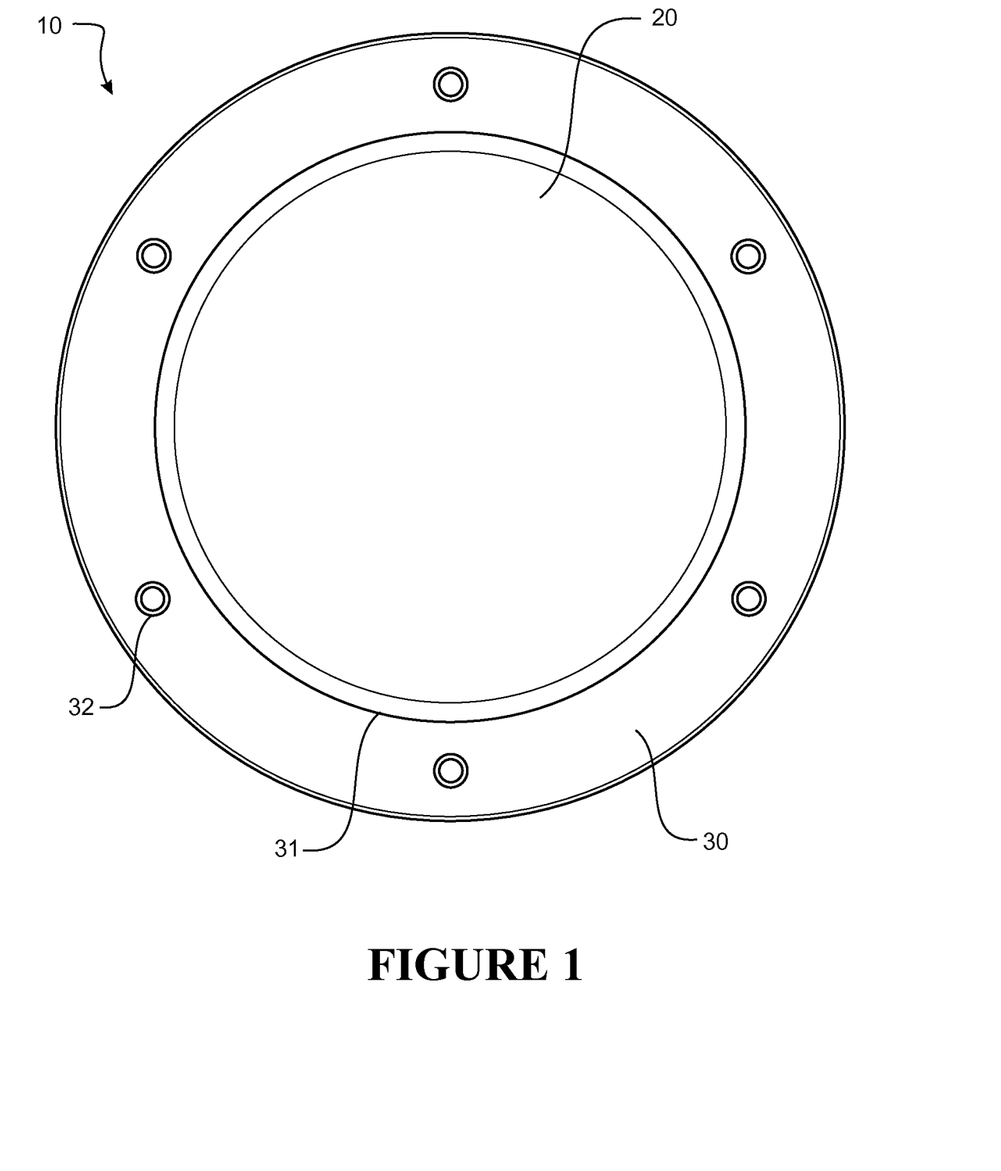
FIG. 1 shows in plan a preferred embodiment of the sealing gland of the present invention, before use.

Referring to FIG. 1, a preferred form sealing gland (10) is shown consisting of a sealing body (20) and a compression ring (30). In use, the sealing gland (10) seals between the outer wall of an elongate member (not shown), such as a pipe or other duct, and a surface through which the elongate member extends. Prior to use, an aperture is formed through the sealing body (20) for receiving and engaging about the elongate member. The sealing body (20) forms the seal between the elongate member and the surface, whilst the compression ring (30) maintains an effective seal by compressing the sealing body (20) as it couples the surface over the body (20). The preferred form sealing gland (10) is formed to seal between an annular member and a flat surface, such as a pipe or duct extending through a ceiling or roof surface. It will be appreciated however that the gland (10) may be formed to seal between an elongate member of any cross-sectional shape, and any planar or irregular surface through which the member extends, as required by the particular application. Such variations are not intended to be excluded from the scope of the invention.

Figure 2:
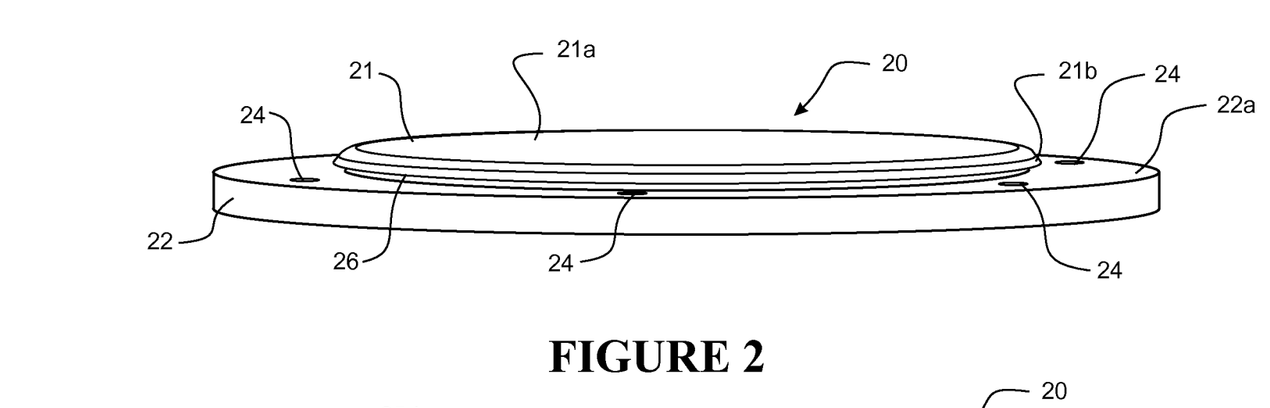
FIG. 2 shows a top perspective view of the sealing body of the embodiment of FIG. 1.

Referring also to FIG. 2, the preferred form sealing body (20) is an annular moulded member having an inner membrane region (21) and a flanged outer peripheral region (hereinafter referred to as flange (22) for convenience). In use, a suitably sized aperture is formed through the inner membrane (21) for receiving the elongate member there through. The aperture is formed to complement the outer peripheral wall of the member in size and shape. The compression ring (30) engages a substantially planar surface (22a) of the flange (22) and in use couples the surface through which the elongate member extends to thereby compress and secure the sealing gland (10) in place against the surface, forming an effective seal. The compression ring (30) is formed from a relatively harder material than the sealing body (20) to compress the sealing body (20) in use. The ring (30) comprises one or more fastener openings or apertures (32) for receiving one or more fasteners there through to mount the gland onto the required surface. Complementary fastener apertures (24) are also provided about the flange (22) for receiving the fasteners there through as will be described in further detail below. A means for retaining (26) the compression ring (30) onto the sealing body (20) is provided to enable handling of the gland (10) as a single unit as it mounted about the elongate member and onto the desired surface.

Figure 3:
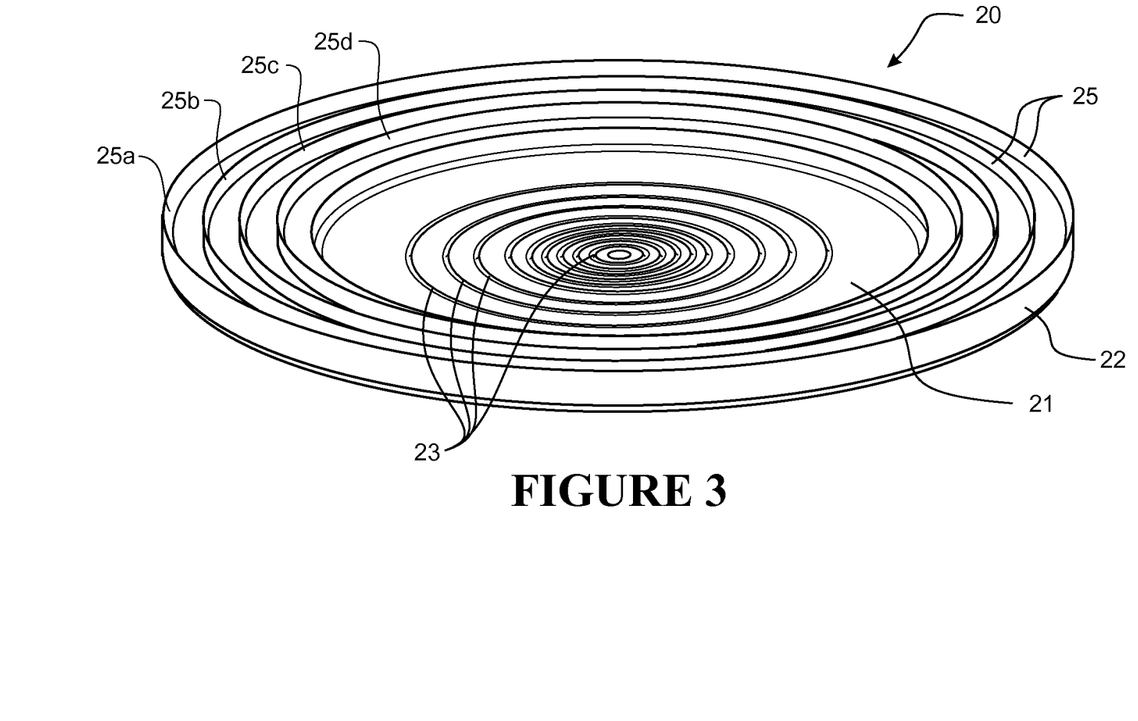
FIG. 3 shows a bottom elevation of the sealing body of FIG. 2.

Referring now to FIG. 3, on an opposite side (hereinafter referred to as underside for convenience), of the flange (22) of the sealing body (20) is at least one annular lip seal (25). In use, the lip seals (25) engage and compress against the surface on which the gland (10) is mounted to form an effective seal against that surface. The lip seals (25) are of sufficiently thin cross section so that with the application of a small amount of pressure from a surface or object they are able to deform and seal about or on that surface or object. In the preferred embodiment shown, there are four such annular lip seals (25a-d), concentrically arranged and preferably evenly spaced from the outer periphery of the sealing body (20). The lip seal (25a) at the edge of the flange is larger than the remaining lip seals (25b-d). It will be appreciated that the number and size of lip seals (25) formed is variable depending on the sealing requirements of the particular application.

Figure 4:
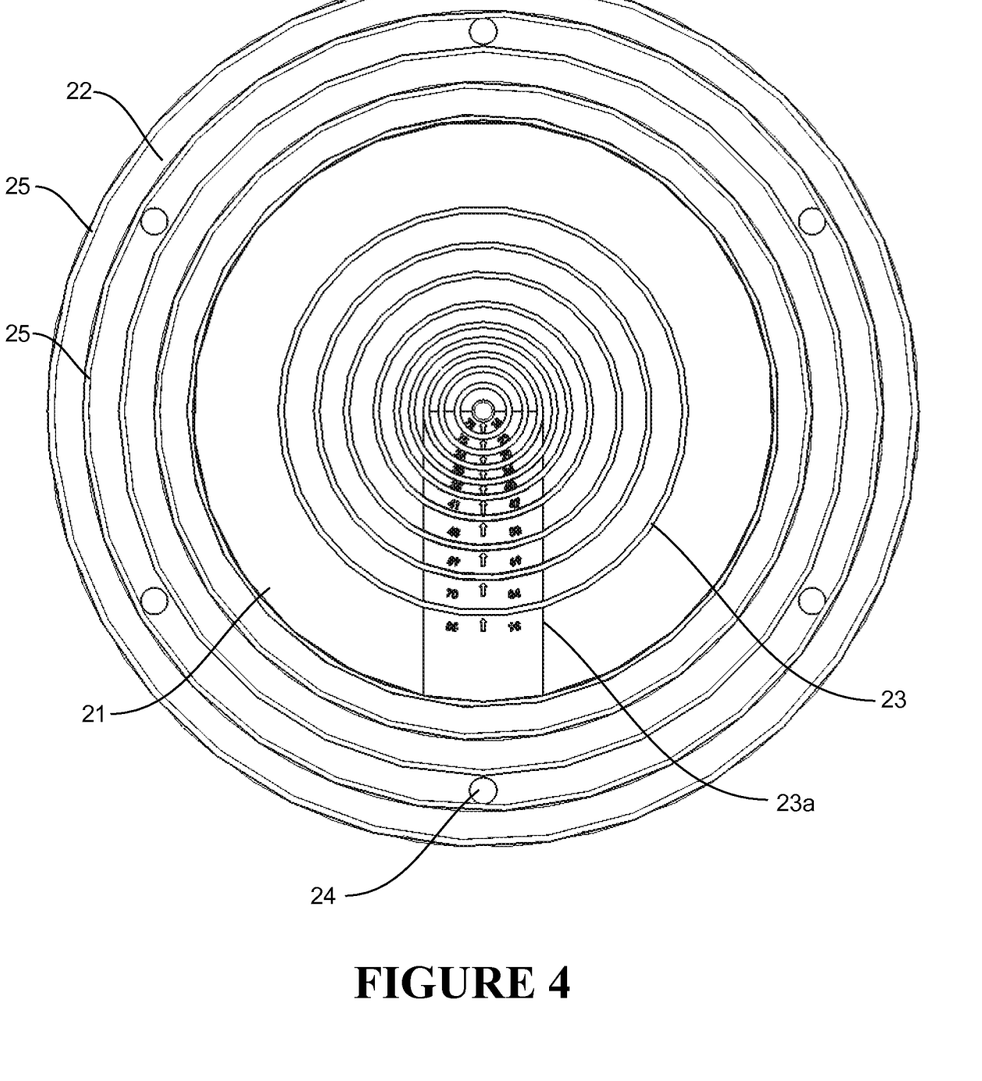
FIG. 4 shows the bottom view of the sealing body of FIGS. 2 and 3, before it has been prepared for use, without an aperture formed in the membrane of the body.

A plurality of aperture forming guides or indicators (23) are also formed (or otherwise provided) on an underside of the inner membrane (21) of the sealing body (20). The guides (23) provide aperture size options for the sealing gland (10). Each guide (23) corresponds to a particular size and/or shape aperture which, in use would conform to and appropriately receive one of a number of conventional or known sized pipes, ducts or other elongate member. In the preferred form, the guides (23) are annular detents formed concentric to one another and to the outer periphery of the sealing body (20), on the under surface of the inner membrane (21). A suitable sized aperture can be formed through the membrane (21) by cutting about the appropriate detent (23). A pipe or duct, having a diameter or size corresponding to that of the formed aperture can then be inserted through the membrane (21) when the sealing gland (10) is to be utilised. It will be appreciated that the guides (23) may alternatively be protrusions or marked indications on the underside of the inner membrane (21). As shown in FIG. 4, marked indicia (23a) are preferably provided in conjunction to the guides (23) to enable interpretation by a user of the various sizes dictated by the guides (23). Furthermore, the shape of the guides (23) is dependent on the cross sectional shape of the elongate member to which the gland (10) is intended and may therefore be rectangular or any other polygonal shape as required by the application. All guides (23) may have the same shape or they may be of different shapes to accommodate different types of elongate members within the one gland (10).

The guides (23) are formed on the same side as the lip seals (25) of the sealing body. In use, when the gland (10) is mounted on a surface, the detents (23) become located adjacent the surface and, therefore, not exposed to the outside environment or ambient conditions. Such a configuration assists to prevent build up of contaminants or other unwanted or undesired material within the small detents (23), which could otherwise be difficult to clean and maintain at an appropriate level of hygiene. Concealing the guides (23) also allows for a smooth and more aesthetically pleasing outer appearance (21a and 22a) to the mounted gland (10). It is therefore a preferred embodiment to form the exposed side (when mounted) of the membrane (21) into a planar/flat surface as shown in FIG. 2.

Figure 5:
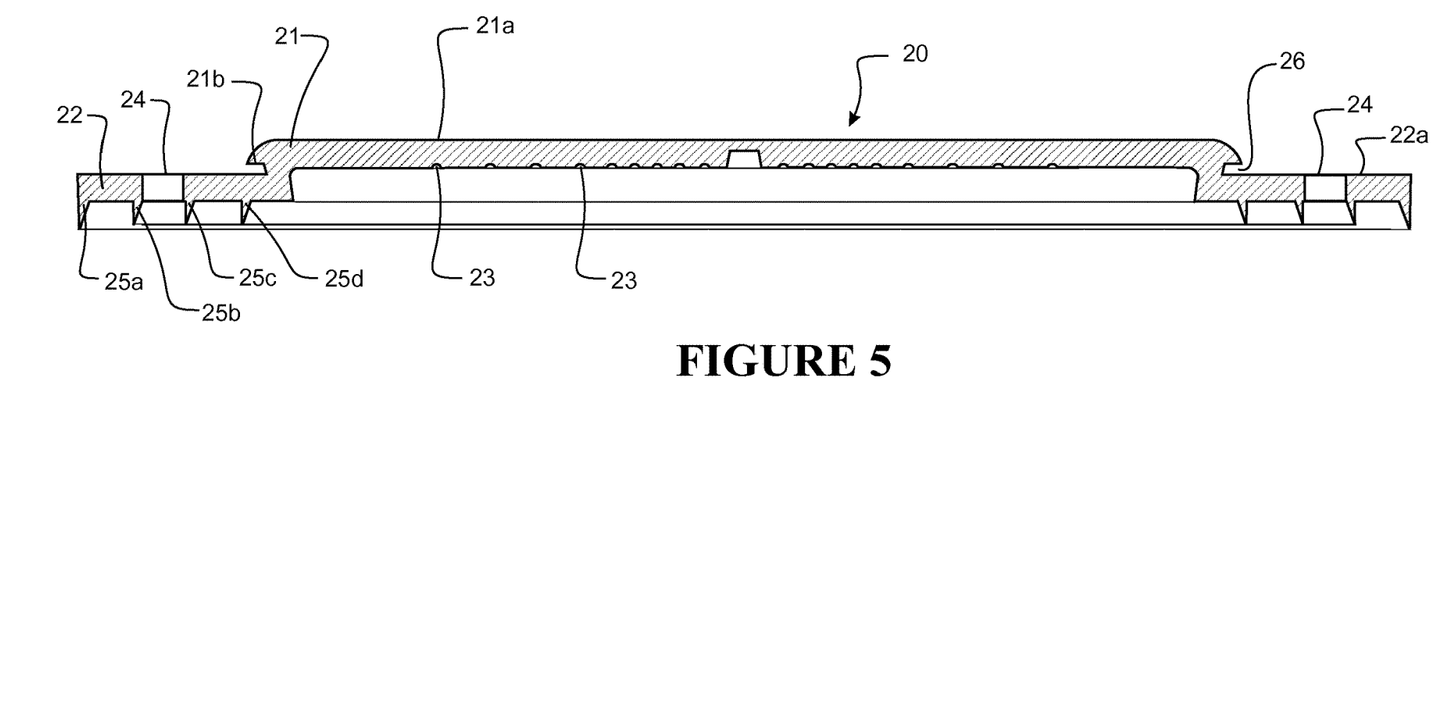
FIG. 5 shows the a cross-sectional view of the sealing body of FIGS. 2 to 4.

Referring now to FIGS. 1, 4 and 5, a plurality of fastener apertures (24) are formed about the flange (22) of the sealing body (20) for aligning with corresponding apertures (32) in the compression ring (30). The fastener apertures (24) and (32) are arranged to receive there through fastening members for mounting the gland (10) onto a desired surface. In the preferred embodiment the apertures (24 and 32) are equally spaced around the flange (22) of the sealing body (20) and around the compression ring (30) respectively. The apertures (24) have diameter(s) such that when a fastener is passed there through an interference fit will be created. In the preferred embodiment this interference fit (i.e. a seal being created between the aperture and the fastener) may be formed either by the size of the apertures (24) being slightly less that of the fastener put there through or may be formed once the gland (10) is assembled and compressed by the compression ring (30). The compression of the sealing body (20) of the gland (10) between the substantially flat surface and the compression ring (30) preferably causes bulging or swelling of the material to seal about the fasteners. The apertures (24) in the embodiment shown are located near the outer periphery of the flange (22) between the second (25b) and third (25c) lip seals. The location may be different in alternative embodiments depending on the configuration of compression ring (30) for instance. The apertures (32) of the compression ring (30) and the apertures (24) of the sealing body (20) are at least in some parts coaxially alignable so that fasteners can be located there through with ease to engage with the surface underneath.

The compression ring (30) may simply fit on the flat surface (22a) of the flange (22) of the sealing body (20) but is preferably retainable by a formation or retention shoulder (26) formed between the flange (22) of the sealing body (20) and a peripheral lip (21b) of the inner membrane (21). The retention shoulder (26) acts to engage about and retain the inner periphery (31) of the compression ring (30), by rising up from the flange (22) on which the ring (30) sits, to overlap at least in part the compression ring (22). The shoulder (26) provides a recess of similar width to the thickness of the compression ring (30). Retention of the ring (30) onto the sealing body (20) enables the gland (10) to be handled as a single unit for simple installation. It also enables the apertures (24 and 32) to be aligned initially, and retained in the aligned state before fasteners are passed through. Optionally the compression ring (30) can be adhered to the sealing body (20) or the sealing body (20) can have been in mould engaged to the compression ring (30). Any other form of retention of the ring is intended to be included within the scope of the invention.

In use, the sealing gland (10) is applied over an elongate member and brought to bear with the annular lip seals (25) against a surface through which the elongate member is to extend. Fasteners are then located through the apertures (32/24) to the surface and are tightened to sufficiently compress the material of the sealing body (20) under the compression ring (30) and also compress the annular lip seals (25) to seal against the substantially flat surface. The sealing aperture of the sealing body (20), through which the elongate member extends is either pre-cut into the supplied unit before its use or may be cut by a user immediately prior to installation or when required for the uses of the sealing gland (10).

The series of concentric guides (23) on the underside of the annular membrane (21) aid in the cutting process. Each guide (23) is preferably formed to indicate a slightly smaller size than the elongate member size to which it corresponds. This results in a sealing aperture that is slightly smaller than the elongate member, and during installation, elastic deformation of the periphery of the sealing aperture forms an effective seal about the elongate member. In other methods of installation the sealing gland (10) may be mounted to the substantially flat surface first and then the elongate member is passed though the appropriate formed sealing aperture.

Figure 6:
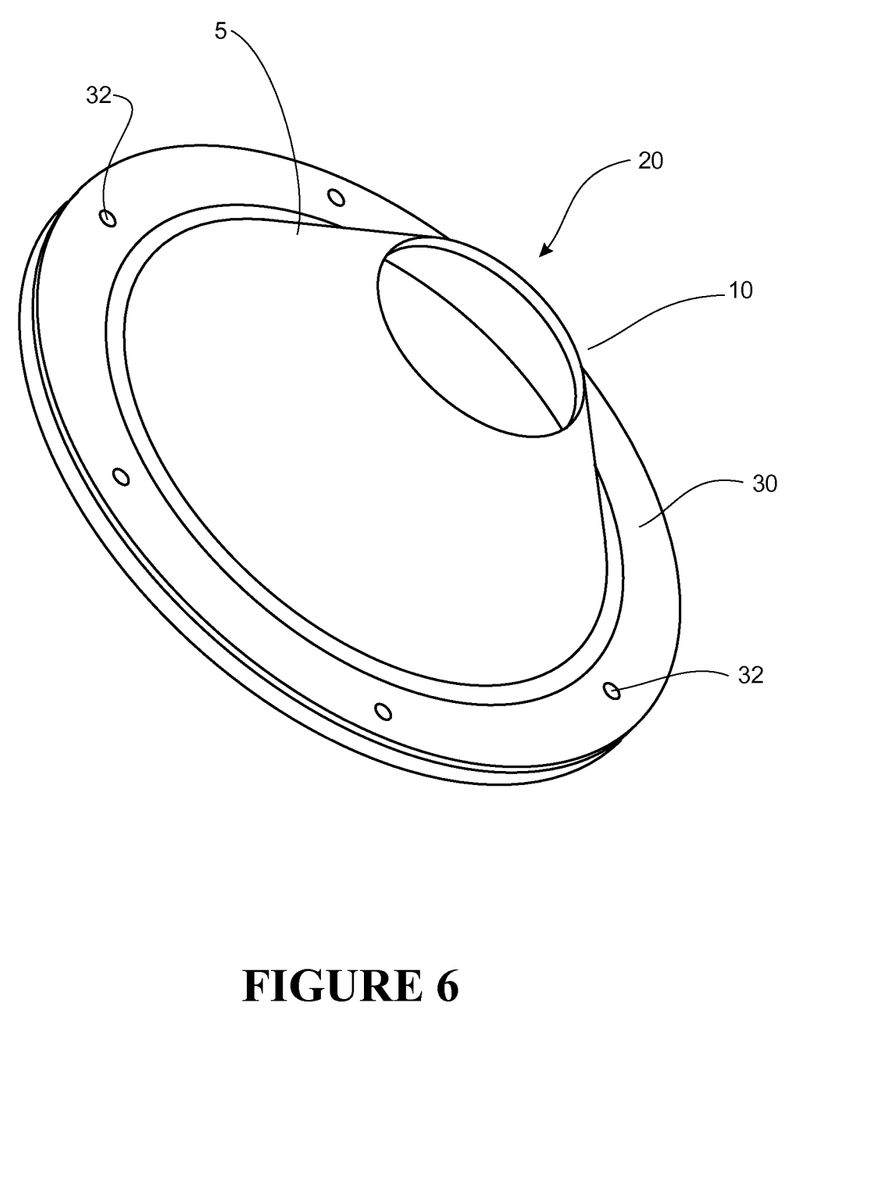
FIG. 6 shows a perspective view of a second embodiment of the sealing gland of the present invention.

In the preferred embodiment shown, the inner membrane (21) of the sealing body (20) is substantially planar. It will be appreciated that other shaped membranes may be formed as required by the particular application, including, but not limited to, conical, cylindrical or any other form. A conical membrane (5) of sealing gland (7) is shown for example as an alternative embodiment in FIG. 6. Cut guides arranged on the inside of the cone provide size indications for sealing apertures. A cut can be made at the appropriate guide to truncate the cone and form the desired sealing aperture (6) for a pipe to go through as required.

The sealing body (20) is formed from a thermally resistant, or chemically resistant, or fire retardant, (or all of these) material, preferably a plastics material such as a moulded high grade silicon. The material also possesses an inherent elastic nature to allow the deformation of the lips seals (25) and also the elastic deformation about the elongate member in the sealing aperture. The compression ring (30) is made of a sufficiently resilient material such that when the sealing gland (10) is applied and fasteners are used, the compression created by the fasteners is able to be resisted by the stiffness of the compression ring so that an even or substantially even pressure is applied to the outer periphery (22) of the sealing body (20) by the compression ring (30). If a higher degree of seal is required then a stiffer compression ring (30) may be used so that more force may be exerted onto the sealing body (20) and therefore the lip seals (25). The compression ring (10) is preferably formed from stainless steel but may be formed from a hard plastics material or other metal based material for example.

It will be appreciated that in alternative embodiments, a compression ring is not utilised by the gland (10) to compress and couple the sealing body (20) appropriately. Other coupling and compression methods, such as a clamping mechanism for instance, are also envisaged without departing from the scope of the invention.

It should be noted that where references to an orientation have been made above (e.g. underside or under surface), these references are relative, and are made for the sake of convenience only. They refer to the gland oriented with the flange (22) located at the lowest part or base of the sealing gland (10). The device of the invention can of course be utilised in any orientation desirable to a user.

The foregoing description of the invention includes preferred forms thereof. Modifications may be made thereto without departing from the scope of the invention as defined by the accompanying claims.

The invention claimed is:

1. A sealing gland for sealing between an elongate member and a surface through which the member extends, the gland comprising:
    a sealing body having an inner membrane for sealing about the elongate member and an outer peripheral region for sealing against the surface, the inner membrane having one or more guides on a side of the membrane arranged to locate adjacent the surface to be sealed in use, hereinafter the underside, and wherein each guide represents a known elongate member option and facilitates the formation of an aperture through the membrane for suitably receiving the associated elongate member option therethrough in use,
    wherein the outer peripheral region of the sealing body comprises one or more lip seals extending from the underside of the sealing body,
    wherein the outer peripheral region comprises one or more fastener apertures, and
    wherein said fastener apertures are located between said lip seals.

2. A sealing gland as claimed in claim 1, further comprising a compression ring arranged to couple the surface over the sealing body to compress the sealing body in use.

3. A sealing gland as claimed in claim 2, wherein the sealing body further comprises a retention shoulder for receiving and retaining the compression ring.

4. A sealing gland as claimed in claim 3, wherein the retention shoulder is formed between the inner membrane and the outer peripheral region of the sealing body for receiving and retaining an inner peripheral edge of the compression ring.

5. A sealing gland as claimed in claim 2, wherein the compression ring is arranged to bear against a side of the outer peripheral region opposing the underside of the sealing body to capture the outer peripheral region between the ring and the surface and cause the lip seals to compress against the surface in use.

6. A sealing gland as claimed in claim 5, wherein the outer peripheral region of the sealing body is an annular flange comprising a plurality lip seals as concentric annular lip seals.

7. A sealing gland as claimed in claim 2, wherein the compression ring comprises one or more fastener apertures for receiving fasteners there through to couple the surface in use.

8. A sealing gland as claimed in claim 7, wherein the one or more fastener apertures of the outer peripheral region are arranged to coaxially align with the fastener apertures of the compression ring for receiving fasteners there through.

9. A sealing gland as claimed in claim 8, wherein the fastener apertures of the outer peripheral region are of lesser size than the fasteners to aid in establishing a seal in use.

10. A sealing gland as claimed in claim 7, wherein the fastener apertures of the outer peripheral region and the fastener apertures of the compression ring are equally separated about the outer peripheral region and about the compression ring respectively.

11. A sealing gland as claimed in claim 7, wherein the compression ring is rigid so as to not substantially deform under the pressure applied by said fasteners.

12. A sealing gland as claimed in claim 2, wherein the compression ring is formed from a material of greater stiffness relative to the stiffness of the sealing body.

13. A sealing gland as claimed in claim 12, wherein the compression ring is formed from a stainless steel.

14. A sealing gland as claimed in claim 1, wherein the outer peripheral region of the sealing body comprises four lip seals, wherein a fourth lip seal of the four lip seals is the outermost lip seal, and wherein the fastener apertures are located between a second and a third lip seal of the four lip seals.

15. A sealing gland as claimed in claim 14, wherein said four lip seals are annular lip seals concentrically arranged and evenly spaced from the outer peripheral region of the sealing body.

16. A sealing gland as claimed in claim 1, wherein the outer peripheral region of the sealing body comprises a plurality of lip seals, and wherein the fastener apertures are located between a concentric pair of said plurality of lip seals.

17. A sealing gland as claimed in claim 1, wherein the one or more lip seals are of a sufficiently thin or thinned cross-section such that said one or more lip seals are able to deform and seal about or on the surface upon application of a small amount of pressure.

18. A sealing gland as claimed in claim 1 wherein a lip seal at the edge or an outermost edge of the outer peripheral region is larger (being of a longer length or height) than the remaining lip seals.

19. A sealing gland as claimed in claim 1, wherein the inner membrane is arranged to seal about a pipe, and the inner membrane comprises a plurality of concentric annular cut guides representing a plurality of pipe diameter options for facilitating cutting of an aperture in accordance with a diameter of the pipe to be received therethrough in use.

20. A sealing gland as claimed in claim 1, wherein the guides are annular detents on the underside of the inner membrane.

21. A sealing gland as claimed in claim 1, wherein the inner membrane is substantially planar.

22. A sealing gland as claimed in claim 1, wherein the inner membrane has a substantially conical form.

23. A sealing gland as claimed in claim 1, wherein the sealing body is formed from an elastic resilient material and chemically inert material.

24. A sealing gland as claimed in claim 23, wherein the sealing body is a moulded Silicone component.

25. A seal in situ formed between an elongate member and a substantially flat surface by a peripheral sealing gland, said peripheral sealing gland comprising or including:
   a sealing body having an inner membrane for sealing about the elongate member and an outer peripheral region for sealing against the surface, the inner membrane having one or more guides on a side of the membrane arranged to locate adjacent the surface in use, hereinafter the underside, and wherein each guide represents a known elongate member option and facilitates the formation of an aperture through the membrane for suitably receiving the associated elongate member option there through in use,
   wherein the outer peripheral region of the sealing body comprises one or more lip seals extending from the underside of the sealing body,
   wherein the outer peripheral region comprises one or more fastener apertures, and
   wherein said fastener apertures lie between said lip seals.

26. A sealing gland comprising:
   (I) a moulded item that defines
      (A) an annular peripheral region having at least one annular seal on its underside effective for sealing against a flat surface and an array of fastener openings or frangible zones to provide fastener openings outwardly of said underside seal(s),
      (B) a membrane region inwardly of the peripheral region which has either (a) an imperforate disc, cone or other form, or (b) has a centrally apertured disc, cone or other form, the membrane region defining on its underside size identified mutually concentric, and concentric to the annular peripheral region and/or its underside seal(s), cut guides whereby a chosen cut be known to fit a particular size diameter pipe, duct or the like, and
   (II) a compression ring with holes aligned to the fastener holes or the frangible zones to provide the fastener holes of the peripheral region of the moulded item
   wherein said fastener openings lie between said underside seal(s).

27. A sealing gland as claimed in claim 26, wherein the compression ring is captured by a retention shoulder of the moulded item that over lies a peripheral inner region of the compression ring.

* * * * *